United States Patent
Yang et al.

(10) Patent No.: US 9,176,666 B2
(45) Date of Patent: Nov. 3, 2015

(54) METHOD AND DEVICE FOR A MULTI-TOUCH BASED CORRECTION OF A HANDWRITING SENTENCE SYSTEM

(75) Inventors: Duan-Duan Yang, Shanghai (CN); Shi-Jie Chen, Shanghai (CN); Feng-Jun Guo, Shanghai (CN); Qi-Zhen He, Shanghai (CN)

(73) Assignee: Symbol Technologies, LLC, Holtsville, NY (US)

( * ) Notice: Subject to any disclaimer, the term of this patent is extended or adjusted under 35 U.S.C. 154(b) by 445 days.

(21) Appl. No.: 13/336,249

(22) Filed: Dec. 23, 2011

(65) Prior Publication Data

US 2013/0162544 A1 Jun. 27, 2013

(51) Int. Cl.
*G06F 3/041* (2006.01)
*G06F 3/0488* (2013.01)

(52) U.S. Cl.
CPC ........ *G06F 3/04886* (2013.01); *G06F 3/04883* (2013.01); *G06F 2203/04808* (2013.01)

(58) Field of Classification Search
None
See application file for complete search history.

(56) References Cited

U.S. PATENT DOCUMENTS

2006/0007190 A1* 1/2006 Pettiross et al. ............. 345/179
2006/0125803 A1* 6/2006 Westerman et al. .......... 345/173
2007/0186158 A1* 8/2007 Kim et al. .................... 715/531
2009/0125848 A1* 5/2009 Keohane et al. .............. 715/863
2009/0158219 A1* 6/2009 Raghupathy et al. ......... 715/863

FOREIGN PATENT DOCUMENTS

CN 1802689 A 7/2006
WO 2005047400 A2 5/2005
WO 2010097171 A1 9/2010

OTHER PUBLICATIONS

Office Action dated May 5, 2015 in related China patent application 2012105666814.2.

* cited by examiner

*Primary Examiner* — Christopher R Lamb

(57) ABSTRACT

A method and device is for a multi-touch based correction of a handwriting sentence system. The method includes receiving touch inputs, generating interpreted input data as a function of the touch inputs, and displaying the interpreted input data on a display device. A request to correct a portion of the interpreted input data then switches to a correction mode. During the correction mode, a correction user interface is displayed on the display device, a gesture is received so setting data is determined as a function of a first disposition of the gesture, the setting data indicating a type of correction to be applied to the portion of the interpreted inputs, a correction data is determined as a function of a second disposition of the gesture, and the portion of the interpreted input data is corrected as a function of the touch input, the setting data, and the correction data.

14 Claims, 3 Drawing Sheets

METHOD AND DEVICE FOR A MULTI-TOUCH BASED CORRECTION OF A HANDWRITING SENTENCE SYSTEM

FIELD OF THE DISCLOSURE

The present disclosure relates generally to handwriting recognition systems and more particularly to making corrections for a sentence handwriting recognition system.

BACKGROUND

An electronic device may be configured with a variety of input devices. For example, the electronic device may include a conventional data input device such as a keyboard. In another example, the input device may include a touch input receiving device such as a touch screen display or a touch pad that receives inputs for selected functionalities. In yet another example, the input device may include a specialized touch screen in which a stylus is required to receive inputs.

When the electronic device includes a touch input receiving device (e.g., touch screen display), it may be configured to further receive inputs such as those that are handwriting related (e.g., letters, numbers, etc.) when a keypad is not shown thereon. Conventional touch input receiving devices may include a sentence handwriting recognition system but it is impossible to achieve as high of an accuracy as a character handwriting system. The degradation in accuracy is usually caused by segmentation errors and/or indistinguishable characters. Conventional correction methods are often not natural and requires a deletion of wrong characters and subsequently inputting correct ones. Therefore, this process may substantially increase an amount of time required to obtain a sentence that is to be entered.

Accordingly, there is a need for a method and device for providing an interface to make corrections in a sentence handwriting recognition system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
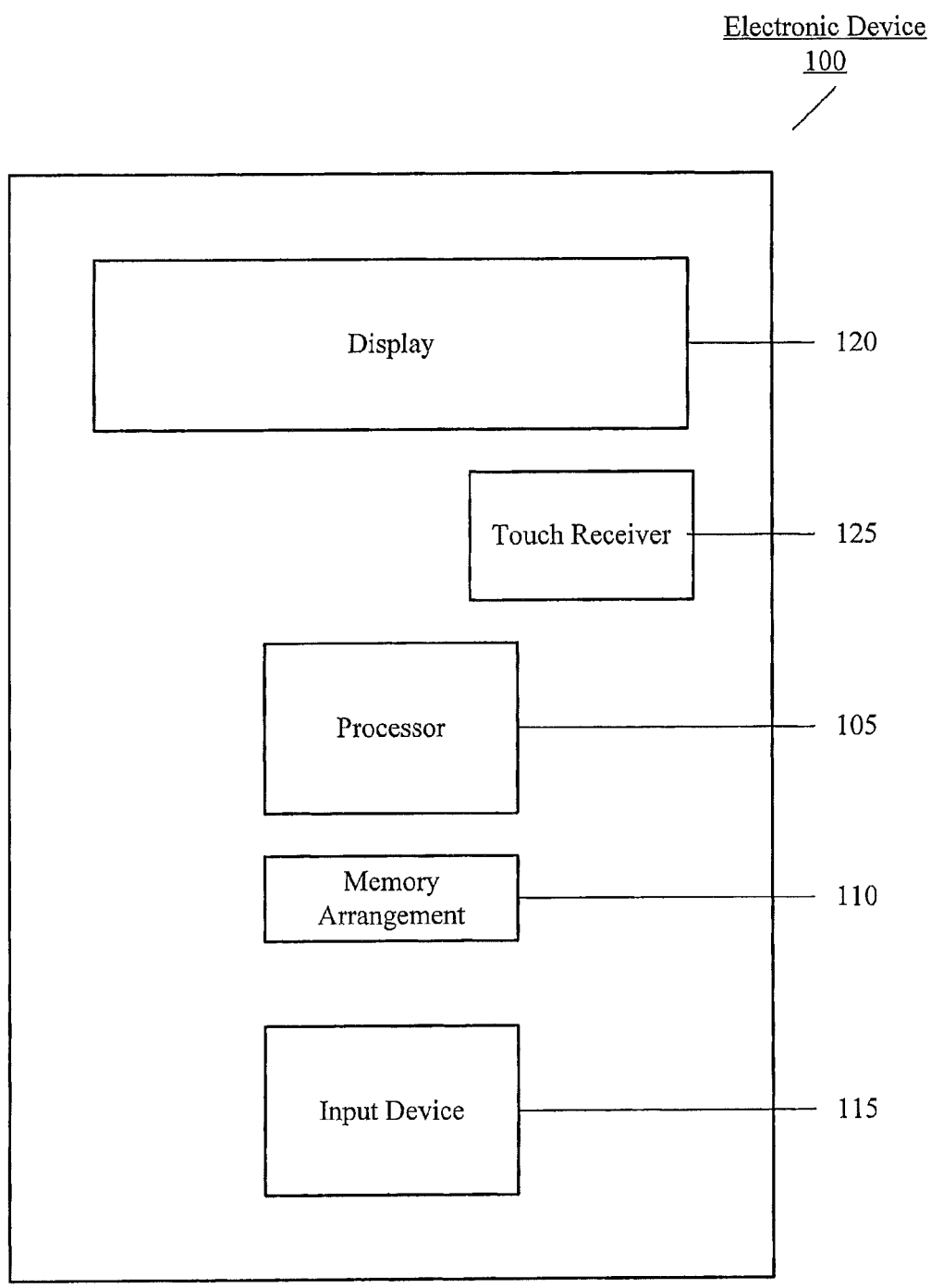
FIG. 1 is a block diagram of an electronic device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method and device is for a multi-touch based correction of a handwriting sentence system. The method comprises receiving at least one touch input via a touch sensitive display device. The method comprises generating interpreted input data as a function of the at least one touch input. The method comprises displaying the interpreted input data on the display device. The method comprises receiving a request to correct at least a portion of the interpreted input data. The method comprises switching to a correction mode. During the correction mode, the method further displays a correction user interface on at least a portion of the display device, receives a gesture via the correction user interface, determine a setting data as a function of a first disposition of the gesture, the setting data indicating a type of correction to be applied to the portion of the interpreted inputs, determine a correction data as a function of a second disposition of the gesture, and correct the portion of the interpreted input data as a function of the at least one touch input, the setting data, and the correction data.

The exemplary embodiments may be further understood with reference to the following description and the appended drawings, wherein like elements are referred to with the same reference numerals. The exemplary embodiments describe a sentence handwriting recognition application (SHWR) for a display including an input device. Specifically, the SHWR allows a user to enter finger gestures upon loading a correction user interface for a section of a sentence already inputted with a further input entered in the correction user interface that corrects an error present in the section of the sentence. The SHWR, the correction interface, the finger gesture, the setting, the input to be entered, and a related method will be discussed in further detail below.

FIG. 1 is a block diagram of an electronic device 100 in accordance with an exemplary embodiment of the present invention. The device 100 may be any electronic device such as a portable device (e.g., smart-phone, PDA, laptop, etc.) or a stationary device (e.g., desktop, copy machine, network server, etc.). The device 100 may include a processor 105, a memory arrangement 110, an input device 115, a display 120, and a touch receiver 125. It should be noted that the device 100 may include a variety of other conventional components such as a transceiver, a power supply, ports to connect to other devices, etc.

The processor 105 may provide conventional functionalities for the device 100. For example, the device 100 may include a plurality of applications that are executed on the processor 105 such as a word processing application or a web browser. The processor 105 may also receive gestures entered via the input device 115 and/or the display 120. The memory 110 may also provide conventional functionalities for the device 100. For example, the memory 110 may store data related to operations performed by the processor 105. It should be noted that the memory 110 may be any memory arrangement configured to store data. As will be described in further detail below, the memory 110 may also store received touch inputs and preset gestures that indicate a setting and a corresponding action to be taken for a correction. The device 100 may include the SHWR which may be a program executed on the processor 105 and stored in the memory 110.

The input device 115 may be any conventional input component such as a keypad, a mouse, etc. It should be noted that although the device 100 includes a display configured to receive finger gestures thereon, a conventional input device 115 may also be provided. The display 120 may be any conventional display that is configured to display data to the user. Furthermore, the display 120 may be configured to receive finger gestures to enable a user to enter inputs via a touch interface. Specifically, the display 120 may represent any touch sensitive display device that is capable of receiving an input and/or showing data. The input may be received in a variety of different ways such as with heat from a user's finger(s), contact from a user's finger(s), a stylus, etc. The touch receiver 125 may be configured to receive the touch inputs from the display 120. It should be noted that the finger gestures may be provided via a variety of manners such as a tactile contact, a heat contact, a combination thereof, etc.

According to the exemplary embodiments of the present invention, the device 100 may be configured with a conventional handwriting recognition system (HWR). Accordingly, the display 120 may receive a variety of different finger gestures that the HWR interprets to generate a character to be entered. Specifically, the finger gestures may be a touch input that generates interpreted input data (e.g., letters, numbers, etc.) as a function of the touch input entered by a user. The display 120 will subsequently show the interpreted input data. After a sequence of characters are entered, the user of the device 100 may utilize the SHWR in accordance with some embodiments. Specifically, the SHWR may enable the user to make corrections from the sequence of characters that form a sentence. It should be noted that the term "sentence" refers to any group of characters. For example, the term "sentence" may include a group of words that form a complete grammatical sentence, a group of words that form a phrase, any word including at least one character, a single or series of numbers, a single or series of punctuation marks and/or symbols, a combination thereof, etc. That is, the "sentence" may refer to any string of characters that may also include spaces.

Figure 2:
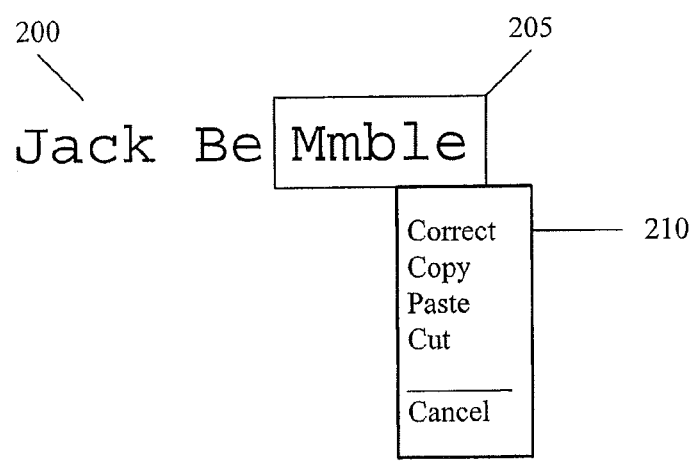
FIG. 2 is a displayed entry of a sentence handwriting recognition system in accordance with some embodiments.
Figure 3:
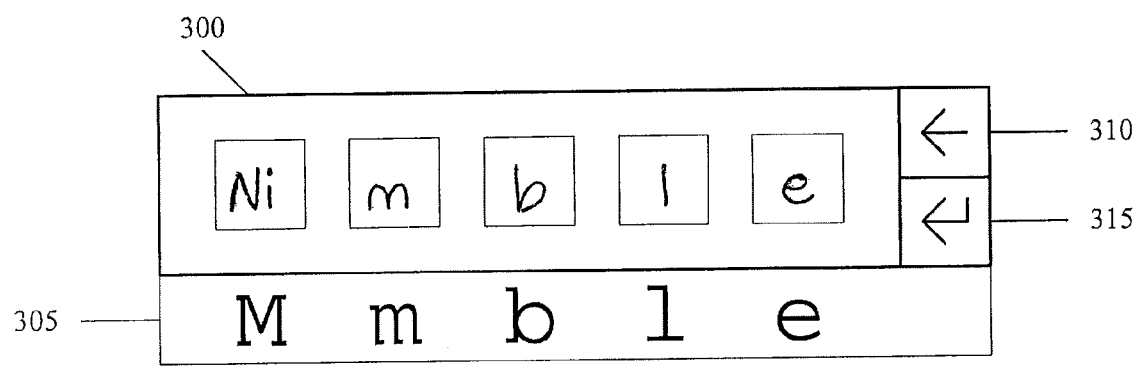
FIG. 3 is a user interface for a selected portion of the displayed entry in FIG. 2 in accordance with some embodiments.

According to the exemplary embodiments of the present invention, the correction feature may be activated for a word(s) in a sentence that has been input. As illustrated in FIG. 2, the sentence 200 may be shown on the display 120 and recite "Jack Be Mmble." The user may select the word 205 reciting "Mmble" using any conventional form of selection such as via the input device 115, a highlighting feature of the touch receiver 125, etc. It should be noted that the selection of one word is only exemplary and the selection may be a portion of a word, more than one word, etc. The selection may bring up a menu 210. According to the exemplary embodiments of the present invention, the menu 210 may include an option "Correct" in addition to conventional options such as "Copy," "Paste," "Cut," and "Cancel." When the "Correct" feature is selected from the menu 210, a correction mode may be switched thereto and a correction user interface may be shown on the display 120. As illustrated in FIG. 3, the correction user interface may include the touch inputs 300 as entered by a user (e.g., handwriting electronic inks, E-ink, etc.), the interpretation 305 by the touch receiver 125 for the touch inputs, a backspace 310, and an enter 315. As discussed above, the touch inputs 300 as entered by the user may be stored in the memory 110. Thus, when the selection for the word 205 is selected, the touch inputs 300 for the word 205 may be retrieved from the memory and shown on the display 120.

Once the correction user interface is shown on the display 120, the display 120 may receive a variety of different finger gestures that indicate a setting and a resultant action to be taken for the word(s) and/or a character(s) in the selected portion. As will be described in further detail below, the finger gestures may be used to delete a character, correct a single character into multiple characters, combine multiple characters into a single character, insert a space between characters, and change a case of a character. Once all corrections in the selected word 205 is performed, the enter key 315 may be used (e.g., touched, tapped, etc.) to indicate that the correction is complete. Subsequently, the correction user interface may be closed and a corrected sentence may be shown on the display 120.

It is noted that the following descriptions for the corrections that are enabled with the correction user interface assumes that the word 205 has been selected from the sentence 200. Furthermore, the correction user interface is being shown on the display 120 with the touch inputs 300 and the interpretation 305 as shown in FIG. 3.

In a first correction according to the exemplary embodiments of the present invention, a deletion of a character may be made. As described above, the correction user interface may include a backspace 310. Thus, when the selected portion (e.g., word 205) of the sentence 200 includes a character that is extraneous, the user may select one of the corresponding touch inputs 300 (e.g., one-finger gesture tapping the character box) to initially indicate a setting data which corresponds to a deletion. The selected touch input may be highlighted in a substantially similar manner as the selection of the word 205 in the sentence 200 as shown in FIG. 2. Subsequently, the backspace 310 may be selected (e.g., tapped) to delete the selected touch input which indicates a correction data which corresponds to which character(s) is to be deleted. When the enter key 315 is selected to complete the corrections and close the correction user interface, the sentence 200 may be updated with the word 205 having a deleted character.

In a second correction according to the exemplary embodiments of the present invention, a correction of a single character into multiple characters may be made. Specifically, a split-over combination error may be corrected. As discussed above, the touch receiver 125 may misinterpret a touch input and display an incorrect character. For example, a common misinterpretation for English inputs is an upper case "N" followed by an upper or lower case "i". The touch receiver 125 may misinterpret this permutation as an upper case "M", such as the case shown in FIGS. 2 and 3. In another example, Chinese characters may often be misinterpreted when separate characters are intended but the touch receiver combines them into a single character. According to the exemplary embodiments of the present invention, the SHWR may allow a two-finger gesture that is placed substantially within a single touch input which indicates a setting data which corresponds to the split-over combination error. A subsequent separation action that increases the distance between the two fingers may indicate a correction data that the character is to be reinterpreted such as reading the touch input again and make a further determination. For example, when two fingers from the user are sensed in the first touch input "Ni" in FIG. 3, the SWHR may reinterpret the touch input. Thus, the "M" character may be determined to actually be the "N" and "i" or a single Chinese character should be separated into two characters. Therefore, when the touch receiver 125 receives a two-finger gesture within a single touch input followed by a separation movement between the two fingers, the character originally interpreted may be separated for correction.

In a third correction according to the exemplary embodiments of the present invention, a correction of multiple characters into a single character may be made. Specifically, a combine-over segmentation error may be corrected. As discussed above, the touch receiver 125 may misinterpret a touch input and display an incorrect character in anther manner. For example, a common misinterpretation for English inputs is between a numerical "13" input and an upper case "B". Specifically, the touch receiver 125 may misinterpret an upper case "B" with the number "13." In another example, an opposite error for Chinese characters as discussed above with the split-over combination error may occur when a single character is intended but the touch receiver separates them into multiple characters. According to the exemplary embodiments of the present invention, the SHWR may allow a two-finger gesture that is placed with each finger substantially within respective, adjacent touch inputs which indicates a setting data for the combine-over segmentation error. A subsequent merging action that decreases the distance between the two fingers may indicate that the character is to be reinterpreted such as reading the touch input again and make a further determination, thereby indicating a correction data for the combine-over segmentation error. For example, when two fingers from the user are sensed with one finger in the touch input for the number "1" and another finger in the touch input for the number "3", the SWHR may reinterpret the touch input. Thus, the "13" character may be determined to actually be the upper case "B" or multiple Chinese characters should be combined into a single character. Therefore, when the touch receiver 125 receives a two-finger gesture where each finger is sensed on respective, adjacent touch inputs followed by a merging movement between the two fingers, the character originally interpreted may be combined or reinterpreted for correction.

In a fourth correction according to the exemplary embodiments of the present invention, an insertion of a space between characters may be made. Specifically, a missing space error may be corrected. With this error, the touch receiver 125 may omit a touch input intended to be a space (e.g., a touch input that is not long enough) or may misinterpret the touch inputs to inadvertently not include an intended space. According to the exemplary embodiments of the present invention, the SHWR may allow a two-finger gesture that is placed with each finger substantially within respective, adjacent touch inputs to indicate a setting data for the insertion of a space. In this manner, it is assumed that a space is absent or an additional space is required. A subsequent separating action that increases the distance between the two fingers may indicate that a space is to be inserted therebetween thereby indicating the correction data for the insertion of the space. For example, when two fingers from the user are sensed with one finger in the touch input for the character "l" in the word 205 and another finger in the touch input for the character "e" followed by a separating action, the SWHR may insert a space therebetween. Therefore, when the touch receiver 125 receives a two-finger gesture where each finger is sensed on respective, adjacent touch inputs followed by a separating movement between the two fingers, a space is inserted between the formerly adjacent characters. As discussed above with the split-over combination error, a substantially similar action is performed. However, the touch receiver 125 may distinguish between these corrections as the two-finger gesture is applied to a single character or to two separate characters.

In a fifth correction according to the exemplary embodiments of the present invention, a change of a case of a character may be made. Specifically, a similar symbol recognition error such as upper/lower case may be corrected. English inputs may include a variety of common errors between upper case letters and lower case letters or punctuation. For example, an upper case "O" and a lower case "o" may have substantially similar finger gestures for character input with the difference being in size of the input. The touch receiver 125 may misinterpret between this error. Other common letters having this problem are "z", "s", "k", "m", "p", "u", "v", "w", "x", and "y". According to the exemplary embodiments of the present invention, the SHWR may allow a three-finger gesture that is placed with each finger substantially within a single touch input to indicate the setting data for the symbol recognition error. A subsequent increasing action that increases the distance between the three fingers may indicate that the character is to be changed to upper case while a subsequent decreasing action that decreases the distance between the three fingers may indicate that the character is to be changed to lower case thereby indicating the correction data for the symbol recognition error. For example, when three fingers from the user are sensed in the touch input for the lower case letter "m" in the selected word 205 followed by an increasing action, the character may be changed to an upper case letter "M". Therefore, when the touch receiver 125 receives a three-finger gesture all substantially within a single touch input followed by an increasing or a decreasing movement between the three fingers, the character originally interpreted may be changed to a corresponding upper case or lower case.

It should be noted that the correction user interface may immediately show the correction changes being made. That is, a dynamic correction feature may be utilized for the correction user interface. Thus, when a change is made, for example, to the first character "M" of the word 205 for separation into the characters "N" and "i," the correction user interface may be updated immediately to show the touch inputs 305 as "N," "i," "m," "b," "l," and "e" while the interpretation 305 is also shown as "N," "i," "m," "b," "l," and "e." Accordingly, any further changes may be made with a single correction user interface. For example, the upper case of the first character "N" may be changed to lower case "n" as described above using a three-finger gesture that decreases a distance. However, it should also be noted that changes being made in the correction user interface may be shown only after completing a first set of corrections. For example, a single correction may be made for each character. Then, upon closing the correction user interface, the sentence 200 may be updated with the change and shown on the display 120. Should a further correction be necessary, a selection may be made of the updated sentence and another correction user interface may be shown on the display 120.

It should also be noted that the correction user interface may include further finger gestures that correspond to other actions to be taken on the selected portion of the sentence. For example, subsequent to the insertion of a space as described above, a further action may entail the addition of a new character within the created space. A prompt may be displayed with a query as to whether the created space is to insert a new character. If affirmative, the correction user interface may display a new character box for the touch input to be received.

It should further be noted that the disposition of the finger gesture substantially within a single character or adjacent characters may be interpreted by the SHWR accordingly. For example, when multiple fingers are disposed within a single character box, it is possible that a contacting area of the fingers on the display 120 may exceed the boundaries of the box. However, the SWHR may determine, for example, through a majority of the contacting area whether the finger gesture is intended to be within a single character or whether each finger of the finger gesture is intended to be contacting adjacent characters.

Figure 4:
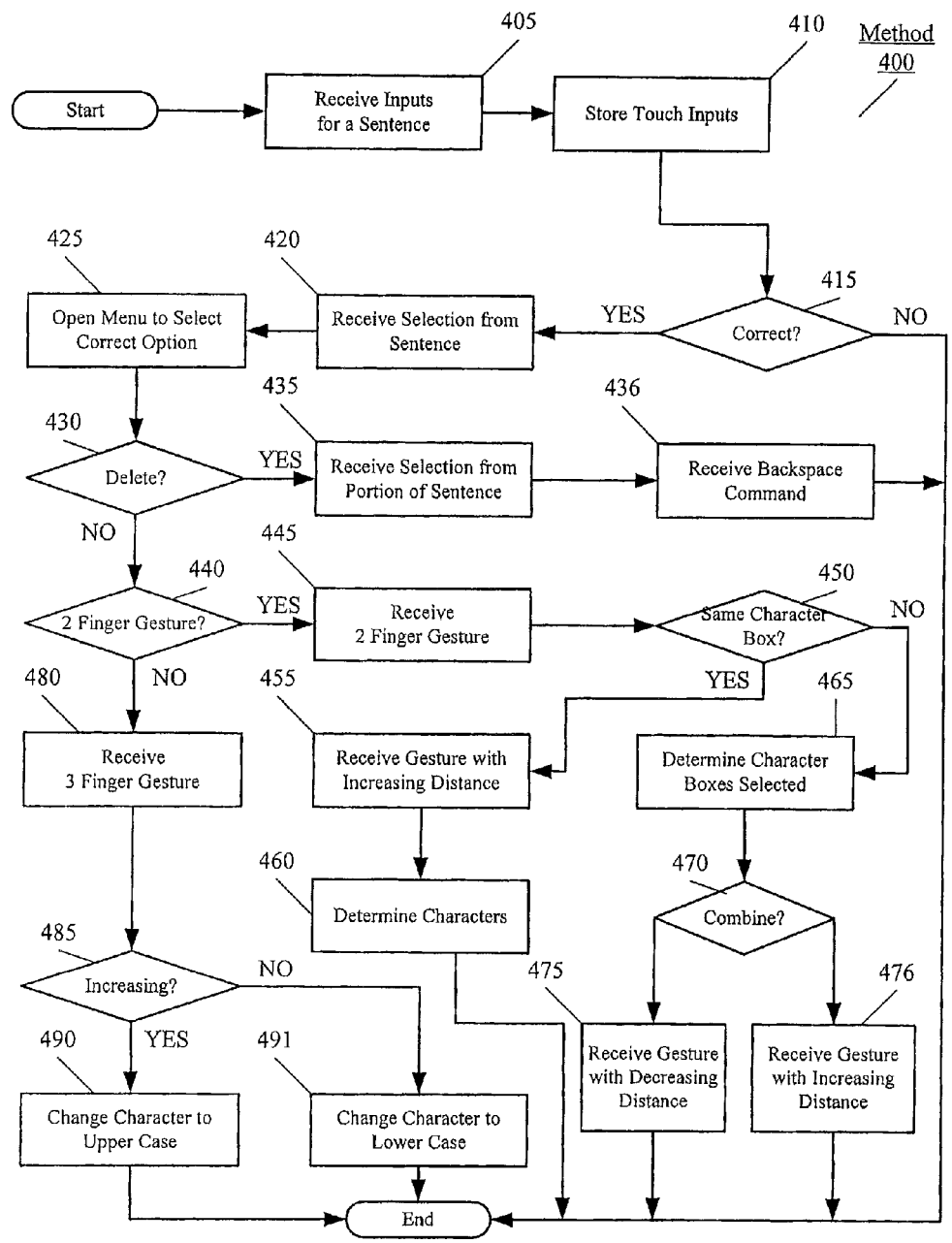
FIG. 4 is a flowchart of a method for correction in a sentence handwriting recognition system in accordance with some embodiments.

FIG. 4 is a flowchart of a method 400 for correction in the SHWR in accordance with an exemplary embodiment of the present invention. The method 400 will be described with reference to the device 100 of FIG. 1 and its components as well as the sentence 200 of FIG. 2 and the correction user interface of FIG. 3. The method 400 incorporates the possible finger gestures for correction in the correction user interface as described above. However, it should again be noted that the finger gestures described above and herein are only exemplary and the SHWR of the present invention may include further finger gestures.

In step 405, the touch inputs for a sentence are received on the display 120. The touch receiver 125 may interpret the touch inputs and generate corresponding inputs to be shown on the display 120. In step 410, the touch inputs are stored in the memory 110. As discussed above, the touch inputs may be retrieved from the memory 110 when the correction user interface is activated.

In step 415, a determination is made whether the sentence that has been input requires correction. If no corrections are required, the method 400 ends. However, if corrections are necessary, the method 400 proceeds to step 420. In step 420, a selection from the sentence is received. For example, in FIG. 2, the word 205 is selected from the sentence 200. Subsequently, in step 425, the menu 210 is opened to provide the possible options therein. Since a correction is required as determined in step 415, the "correct" option may be selected to enter a correction mode. Thereafter, the correction user interface may be opened.

In step 430, a determination is made whether a deletion is to be made. As discussed above, the correction user interface may include a backspace 310 to provide the deletion option. If the determination indicates that a deletion is to be made (e.g., selection of one of the touch inputs 300), the method 400 proceeds to step 435 where a selection is received from the word 205 as displayed in the correction user interface shown in FIG. 3. Upon receiving the selection, the backspace 315 may be selected to receive the backspace command so that in step 436, the selected touch input is deleted.

Returning to step 430, when the correction to be made is not a deletion, the method 400 proceeds to step 440. In step 440, a determination is made whether a two-finger gesture is received. When a two-finger gesture is received, several possible corrections are possible. Thus, the method 400 continues to step 445 in which the two-finger gesture is received.

In step 450, a determination is made whether the two-finger gesture is received in the same character box or touch input as shown in FIG. 3. If the two-finger gesture is substantially within a single touch input, the method 400 proceeds to step 455 where the two-finger gesture with an increasing movement is received. As discussed above, this two-finger gesture is to provide a correction that is related to a split-over combination error. Thus, in step 460, the characters to be split are determined and subsequently updated.

Returning to step 450, if the two-finger gesture is not for a single touch input, the method 400 proceeds to step 465. In step 465, the character boxes or touch inputs that are selected from each finger of the two-finger gesture are determined. As discussed above, each finger of the two-finger gesture may be present on adjacent touch inputs.

In step 470, a determination is made whether a combination of characters is to be performed. If the error is related to a combination of characters, the method 400 continues to step 475 where the two-finger gesture is followed by a merging motion. As discussed above, this indicates that the error is a combine-over segmentation error and the two touch inputs are reinterpreted to provide an updated, single character. If the error is not related to a combination of characters, the method 400 continues from step 470 to step 476 where the two-finger gesture is followed by an increasing motion. As discussed above, this indicates that the error is an omitted space and a space is inserted between the selected, adjacent touch inputs.

Returning to step 440, if the gesture is not a two-finger gesture, the method 400 continues to step 480 in which a three-finger gesture is received. Upon receiving the three-finger gesture, the SWHR may determine that a character is to be changed from an upper case to a lower case, vice versa, or a symbol (e.g., punctuation) is to be changed. Thus, if the three-finger gesture is followed by an increasing motion, the method 400 proceeds to step 490 in which the character is changed from a lower case to an upper case. If the three-finger gesture is followed by a decreasing motion, the method 400 proceeds to step 491 in which the character is changed from an upper case to a lower case.

As discussed above, the method 400 may include additional steps. For example, after each possible route for a correction, a determination may be made whether further corrections are to be made. In this manner, multiple corrections may be made concurrently from a single correction user interface. In another example, after each possible route for a correction, a further step may be included to update the correction user interface with the correction being made when a dynamic correction user interface is provided.

The exemplary embodiments of the present invention provide a sentence handwriting recognition system that has a correction user interface that may be utilized for a selected portion of a sentence. The correction user interface may include multiple configurations of finger gestures that are substantially different from each other that the recognition may indicate a setting and a corresponding action to be taken. In a first example, when a deletion is to be made, a selection may be made and receiving a backspace command located on the correction user interface indicates that the selected touch input is to be deleted. In a second example, when a split-over combination error is to be corrected, a two-finger gesture that is substantially within a single touch input and followed by an increasing motion provides a reinterpretation of the touch input, thereby generating two separate characters from an originally determined single character. In a third example, when a combine-over segmentation error is to be corrected, a two-finger gesture in which each finger is on respective, adjacent touch inputs and followed by a merging motion provides a reinterpretation of the touch input, thereby generating a single character from an originally determined separate characters. In a fourth example, when a space missing error is to be corrected, a two-finger gesture in which each finger is on respective, adjacent touch inputs and followed by an increasing motion allows for an insertion of a space between the originally determined adjacent touch inputs. In a fifth example, when a case for a character is to be corrected, a three-finger gesture in which each finger is substantially within a single character and followed by an increasing or a decreasing motion allows for the case of the character to be changed. Specifically, an increasing motion from the three-finger gesture changes the character from a lower case to an upper case while a decreasing motion from the three-finger gesture changes the character from an upper case to a lower case.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic device, comprising:
   a touch sensitive display device configured to receive at least one touch input;
   a processor generating interpreted inputs as a function of the touch inputs; and
   a memory arrangement storing at least the at least one touch input and the interpreted inputs,
   wherein the display device is further configured to show the interpreted inputs and to receive a request to correct at least a portion of the interpreted inputs, the processor switching to a correction mode,
   wherein, during the correction mode, a correction user interface is displayed on at least a portion of the display device, a gesture being received via the correction user interface, further wherein the gesture is a multi-touch input comprising a multi-finger gesture, and
   wherein the processor determines a setting data as a function of a first disposition of the multi-finger gesture, the setting data indicating a portion of the interpreted inputs to which one of a set of types of correction is to be applied, the processor further determining a correction data as a function of a second disposition of the multi-finger gesture so that the portion of the interpreted inputs is corrected as a function of the at least one touch input, the setting data, and the correction data, wherein the set of types of correction comprises:
   a separation to correct a split-over combination error; and
   a combination to correct a combine-over segmentation error.

2. The electronic device of claim 1, wherein the separation is identified via a two-finger gesture wherein each finger is disposed substantially within a single one of the touch inputs in the first disposition, and the fingers are separated in the second disposition.

3. The electronic device of claim 1, wherein the combination is identified via a two-finger gesture wherein each finger is disposed substantially within two adjacent touch inputs in the first disposition, and the fingers are brought together in the second disposition.

4. The electronic device of claim 1, wherein the set of types of correction further comprises:
   a symbol correction identified via a three-finger gesture in which each finger is substantially disposed within a single one of the touch inputs in the first disposition, and the three-finger gesture comprises a separation of each finger from each other and a merging of each finger to each other.

5. The electronic device of claim 4, wherein the separation of each finger from each other for the three-finger gesture is to change the single character from a lower case to an upper case and the merging of each finger to each other for the three-finger gesture is to change the single character from an upper case to a lower case.

6. The electronic device of claim 1, wherein the correction user interface is launched upon choosing the portion of the interpreted inputs and opening a menu including an option for the launching of the correction user interface.

7. The electronic device of claim 1, wherein the correction user interface includes at least the interpreted input data and the at least one touch input as entered by a user.

8. A method, comprising:
receiving at least one touch input via a touch sensitive display device;
generating interpreted input data as a function of the at least one touch input;
displaying the interpreted input data on the display device;
receiving a request to correct at least a portion of the interpreted input data;
switching to a correction mode; and
during the correction mode, performing the following sub-steps:
displaying a correction user interface on at least a portion of the display device;
receiving a gesture via the correction user interface, wherein the gesture is a multi-touch input comprising a multi-finger gesture;
determining a setting data as a function of a first disposition of the multi-finger gesture, the setting data indicating a portion of the interpreted inputs to which one of a set of types of correction is to be applied;
determining a correction data as a function of a second disposition of the multi-finger gesture; and
correcting the portion of the interpreted input data as a function of the at least one touch input, the setting data, and the correction data, wherein the set of types of correction comprises:
a separation to correct a split-over combination error; and
a combination to correct a combine-over segmentation error.

9. The method of claim 8, wherein the separation is identified via a two-finger gesture wherein each finger is disposed substantially within a single one of the touch inputs in the first disposition, and the fingers are separated in the second disposition.

10. The method of claim 8, wherein the combination is identified via a two-finger gesture wherein each finger is disposed substantially within two adjacent touch inputs in the first disposition, and the fingers are brought together in the second disposition.

11. The method of claim 8, wherein the set of types of correction further comprises:
a symbol correction identified via a three-finger gesture in which each finger is substantially disposed within a single one of the touch inputs in the first disposition, and the three-finger gesture comprises a separation of each finger from each other and a merging of each finger to each other.

12. The method of claim 11, wherein the separation of each finger from each other for the three-finger gesture is to change the single character from a lower case to an upper case and the merging of each finger to each other for the three-finger gesture is to change the single character from an upper case to a lower case.

13. The method of claim 8, wherein the correction user interface includes at least the interpreted input data and the at least one touch input as entered by a user.

14. A non-transitory computer readable storage medium including a set of instructions executable by a processor, the set of instructions operable to:
receive at least one touch input via a touch sensitive display device;
generate interpreted input data as a function of the at least one touch input;
display the interpreted input data on the display device;
receive a request to correct at least a portion of the interpreted input data;
switch to a correction mode; and
during the correction mode, the set of instructions operable to perform the following sub-steps:
display a correction user interface on at least a portion of the display device;
receive a gesture via the correction user interface, wherein the gesture is a multi-touch input comprising a multi-finger gesture;
determine a setting data as a function of a first disposition of the multi-finger gesture, the setting data indicating a portion of the interpreted inputs to which one of a set of types of correction is to be applied;
determine a correction data as a function of a second disposition of the multi-finger gesture; and
correct the portion of the interpreted input data as a function of the at least one touch input, the setting data, and the correction data, wherein the set of types of correction comprises:
a separation to correct a split-over combination error; and
a combination to correct a combine-over segmentation error.

* * * * *